Sept. 2, 1947.  T. F. KNIGHT  2,426,619
APPARATUS FOR LOADING SHELLS
Filed Jan. 23, 1943  2 Sheets-Sheet 1

Inventor
Thomas F. Knight
By C. E. Hernstrom & H. E. Thibodeau
Attorneys

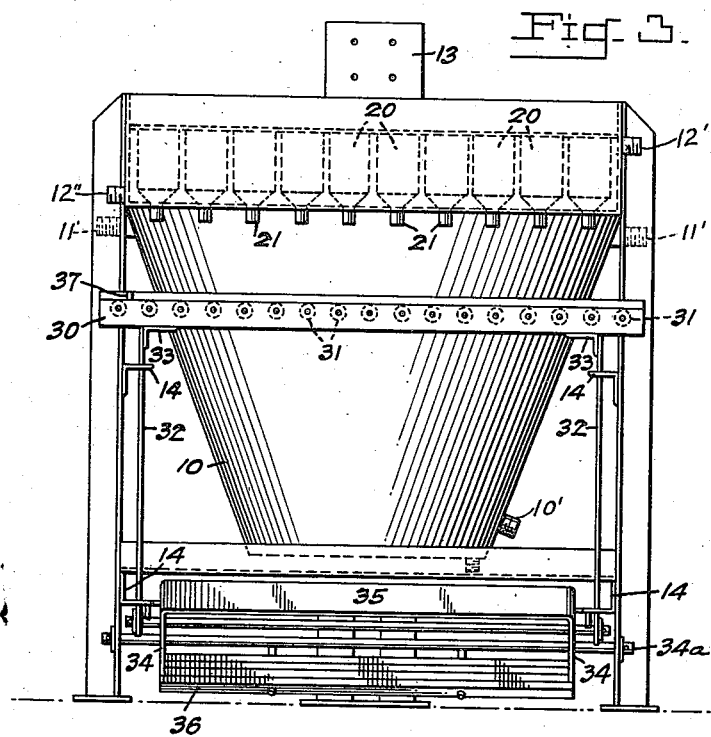
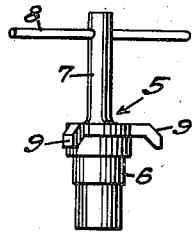
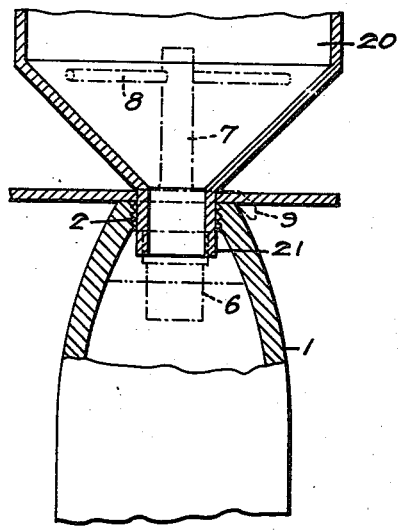
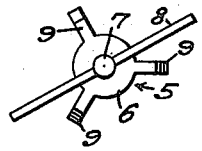

Patented Sept. 2, 1947

2,426,619

UNITED STATES PATENT OFFICE 2,426,619

APPARATUS FOR LOADING SHELLS

Thomas F. Knight, Rockaway Borough, N. J.

Application January 23, 1943, Serial No. 473,300

3 Claims. (Cl. 86—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to the loading of shells, more particularly, to inert melt loading. In the inert melt loading of shells it has been the practice heretofore to load the shell with the inert ingredients and then, after the same had cooled and hardened sufficiently, to drill or otherwise machine a hole in the top surface of the hardened inert material within which to place the booster.

One of the principal objects of this invention is to eliminate the need of drilling or otherwise machining into the hardened inert material. This object of invention is achieved by precasting a proper cavity for the booster. By so providing for the booster cavity during the cooling and hardening of the inert material, the need for subsequent drilling is eliminated. Moreover, there will be a saving in inert material, otherwise lost in the drilling operation. Lastly, the need of cleaning or re-machining the threads of the shell (into which the fuse is screwed) is eliminated.

Another object of this invention, closely allied with the foregoing object, is to provide means in the loading apparatus which will ensure that the shell threads, which need not be cleaned, as pointed out above, because of the precasting of the booster cavity, do not become contaminated by the inert loading operation.

A still further object of this invention is to provide apparatus which will permit the multiple loading of different calibre shells.

For the attainment of the foregoing and such other objects of invention as may appear or be pointed out herein, I have shown one embodiment of my invention in the accompanying drawing, wherein:

Fig. 3 is a front elevation thereof;

Fig. 4 shows a shell, with its upper portion in section to expose the booster cavity, in cooperative relation to the loading spout;

Fig. 5 shows the core device used in the precasting of the booster cavity;

Fig. 6 is a top view of the precasting device of Fig. 5;

Figure 7 is a plan view of a shell tray;

Figure 8 is an elevation of a shell tray shown in section and indicating the position of a shell placed therein; and Figure 9 is a detail sectional view taken on line 9—9 of Figure 3 and showing the tray shelf including the tray stop.

Figure 1:
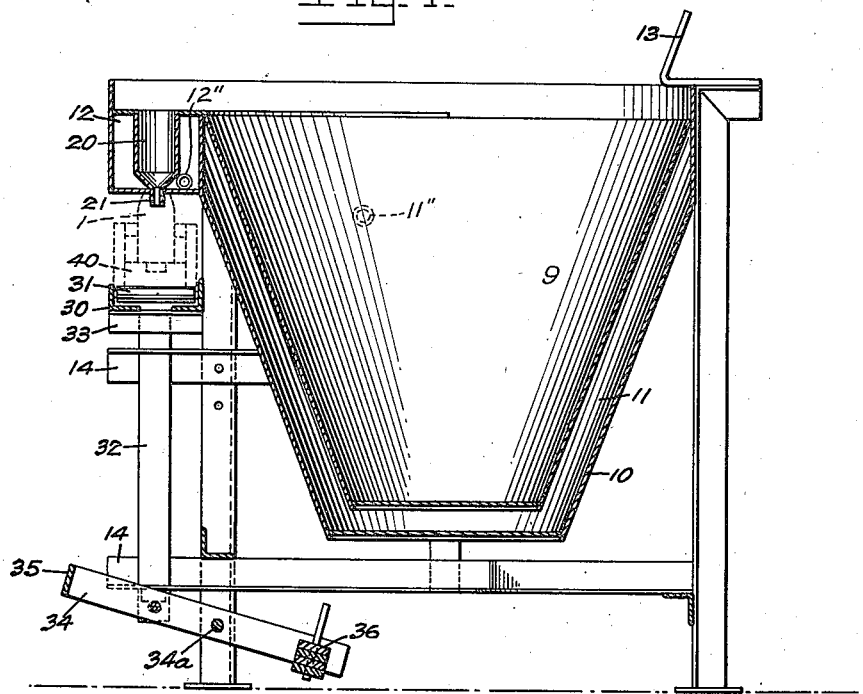
Fig. 1 is a sectional elevation of the apparatus.

The inert material is melted in the kettle 9 surrounded by a steam space 11 formed between the kettle and steam jacket 10. Steam is admitted to the space through steam pipes 11' to melt the material. In front of the kettle and at the upper end thereof is a transversely extending sealed chamber 12 in which there are linearly arranged a plurality of funnels 20 having spouts 21 extending through the floor of the chamber in position to simultaneously enter the open ends of the shells to be filled. Steam is admitted under appropriate pressure to the chamber 12 through inlet pipe 12', so that the material in the funnels is maintained at the proper temperature to facilitate its passage through the spouts 21. A drain pipe 12'' leading to a suitable trap, (not shown) is provided at the opposite end of the chamber. The kettle may be drained through a pipe 10' connected with a suitable plug cock (not shown), and there is let into the bottom of the steam space 11, a pipe fitting to which is preferably attached a suitable valve 41 for draining condensed steam from the steam jacket, all of which is usual in steam jacketed kettles for melting such explosives as TNT. The numeral 13 designates a bracket secured to the frame of the apparatus, which bracket forms a support for stirring propellers, when same are used.

Underlying the spouts 21 of the plurality of loading funnels 20 is a shelf 30 provided with a plurality of rollers 31 upon which is slid a tray or fixture 40, Fig. 1, containing or holding the shells 1 spaced at predetermined distances apart. As best seen in Fig. 4, the spout 21 of loading funnel 20 is sufficiently long to extend a short distance beyond the upper threaded portion 2 of the shell, the spout diameter being such that the spout will pass easily through the threaded mouth 2 of the shell.

The shelf 30 is supported on the apparatus frame for a short extent of vertical adjustment. In the lowermost position of the shelf, sufficient clearance is provided beneath the spouts and the tops of the shells, to permit easy sliding of the tray 40 with its load of shells. After a tray with a load of empty shells has been properly positioned on the shelf 30, with its plurality of shells precisely centered with the funnels 20, the shelf, together with the tray and shells 1, is elevated, to cause the spouts 21 of the plurality of funnels to enter the centered mouths 2 of the shells. The tray 40, as best seen in Figures 1, 3, 7 and 8, is constructed of wood or other suitable material.

It has a base 42, two side members 43 and 44 secured to and extending upwardly from base 42, and a top member 45 secured to and connecting the side members 43 and 44 at their upper edges as shown. A number of spaced holes 46 are drilled through top member 45, each hole being just large enough in diameter to permit a shell 1 to be partly inserted through a hole 46 into the tray as shown, with the lower end of the shell resting on the upper surface of base member 42, and the upper portion of the shell projecting out of hole 46. The holes 46 are spaced so as to locate the mouth of each shell cavity under one of the spouts 21 when the tray is elevated. Cylindrical recesses 47, drilled into the upper surface of base member 42 concentric with and below the holes 46, are provided for reception of end portions of shells of which the lower portions may be quite small in cross section, for furnishing support against lateral movement.

Figure 2:
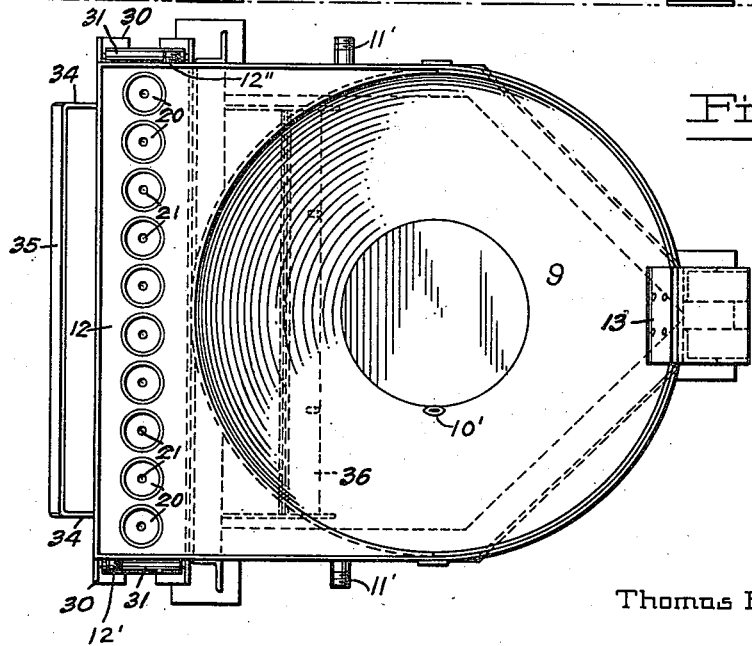
Fig. 2 is a plan view thereof.

For the purpose of mounting the shelf 30 for the said elevational adjustment, each end of shelf 30 is supported by a vertical leg 32, secured to the shelf as by means of angle piece 33, Fig. 3. The vertical legs 32 are supported for sliding movement in slotted passages, provided in angle bars 14 of the machine frame. As best seen in Fig. 1, each of the two legs 32 passes through two such angle bars 14 of the machine frame. The lower ends of vertical legs 32 are articulated to the corresponding one of a pair of lever arms 34. As best seen in Fig. 2, lever arms 34 extend from both ends of a treadle 35, arms 34 and connecting treadle 35 being conveniently formed as a U-shape from a single piece of bar stock. Lever arms 34 are pivoted to the machine frame at aligned points 34a. The rear (rightward, in Figs. 1 and 2) ends of lever arms 34 are connected by a plurality of bars or strips 36 which constitute a counterweight.

By reason of the counterweight 36, the lever arms 34 are maintained normally in the position shown in Fig. 1, with the treadle 35 and shelf 30 in uppermost position. In this (normal) position of the parts, the shells are maintained in position in which the spouts 21 of the loading funnels 20 are received in their threaded mouths (as shown in Fig. 1). The purpose of maintaining the parts of the apparatus and the shells normally in loading condition, i. e., with the loading spouts centered in the shell mouths, is to permit the operator to devote his full attention to the business of loading the shells with the inert material. The actual shell loading is performed manually by means of a calibrated ladle (not shown). The operator simply dips the ladle into the melted material and removes, by means of the calibrated ladle, a precisely calibrated quantity of inert material which he proceeds to pour into the shells, through the pouring funnels 20, one after the other. After loading all the shells of the tray, the operator steps on treadle 35, to lower the shelf 30 together with the tray of shells, to withdraw the loaded shells from the funnel spouts, so that the tray with the loaded shells may be removed, by sliding on rollers 31, from shelf 30. Also, the operator must step on the treadle to lower shelf 30 preparatory to placing thereon and centering a fresh tray of empty shells.

After the loaded shells have been removed from the loading apparatus, as described, and before the inert material has hardened appreciably, i. e., while the inert material is still liquid, a core, designated generally by the reference character 5 and shown in Figs. 5 and 6, is placed in each shell, in the manner shown by dot-and-dash lines in Fig. 4. The function of core 5 is to provide for the precasting of a cavity in the hardened inert material for receiving the booster. Core 5 has a main or forming portion 6 of suitable shape depending upon the booster cavity desired, and a shank portion 7. The upper end of shank 7 has a shaft rod or handle 8 passing therethrough to facilitate handling. The core is further provided with a plurality of centering fingers 9 (three being shown in Fig. 6) which are designed to fit snugly over the top of the shell, as shown by one of the centering fingers 9 in Fig. 4, for the purpose of centering the core centrally in mouth 2 of the shell. Handle rod 8 is made somewhat long and extends on both sides of shank 7, to enable the operator to apply sufficient twist to the core in removing it from the shell, necessitated because of the adherence of the core to the hardened inert material.

A stop 37, see Fig. 3, is provided at one end, the left in Fig. 3, of shelf 30 to precisely position the tray with its shells centered or aligned with loading spouts.

As shown in the drawings, see Figs. 2 and 3, ten 60 mm. shells may be held on a tray for multiple loading, from the ten funnels. If it is desired to load somewhat larger shells, say 81 mm., five such shells may be accommodated on the tray, only five, alternate, funnels being used in loading.

I claim:

1. An apparatus for filling shells or the like with melted explosive comprising, in combination, a frame, a kettle for melting said explosive carried on said frame, a steam jacket surrounding said kettle in spaced relation therewith, a plurality of funnels carried by said frame, each said funnel being provided with a dependent spout defining a vertical axis, linearly arranged on said frame adjacent said kettle and having their respective spouts in predetermined spaced relation, a steam jacket surrounding said funnels, a normally horizontal, vertically movable tray shelf on said frame underlying said spouts and normal to axes thereof, a tray supported on said shelf and adapted to hold a plurality of shells to be filled, said tray being provided with a plurality of spaced recesses to receive and engage said shells so that the respective distances between their axes will be equal to the respective distances between the axes of said spouts, roller means on said shelf to positively guide said tray in horizontal rectilinear movement beneath and in alignment with said spouts, stop means on said shelf to arrest said translative movement of said tray to position said shells thereon in respective axial alignment beneath said spouts, treadle means pivoted to said frame and connected with said shelf and operable to lower said shelf to simultaneously withdraw said shells from filling engagement with said spouts, and counterweight means operable to urge said treadle means to move said shells into filling engagement.

2. An apparatus for filling shells or the like with melted explosive comprising a frame, a kettle for melting explosive on said frame, a steam jacket surrounding said kettle in fixed relation therewith, a funnel mounted on said frame closely adjacent said kettle and having a dependent spout defining a vertical axis, a second steam jacket on said frame surrounding said funnel for the heating thereof, a normally horizontal, vertically adjustable shelf on said frame underlying said spout and normal to the said axis thereof, a tray supported on said shelf adapted to hold a shell to be filled, there being a recess in said tray to engage a portion of said shell, roller means on said frame adapted to positively guide said tray and a shell thereon in horizontal rectilinear movement beneath said spout, stop means on said shelf to arrest said rectilinear movement to position said shell in axial alignment with said spout, treadle means carried by said frame, said treadle means being operable to vertically move said shelf and tray from a first position in which a shell on said tray is in filling engagement with said spout to a second position in which said shell is lowered out of engagement with said spout, and counterweight means connected with said treadle means to urge said shelf and tray into said first position.

3. An apparatus for filling shells or the like with melted explosive comprising a frame, a funnel mounted on said frame and having a dependent spout defining a vertical axis, a steam jacket on said frame surrounding said funnel for the heating thereof, a normally horizontal, vertically adjustable shelf on said frame underlying said spout and normal to the axis thereof, a tray supported on said shelf adapted to hold a shell to be filled, there being a recess in said tray to engage a portion of said shell, roller means on said frame adapted to positively guide said tray and a shell thereon in horizontal rectilinear movement beneath said spout, stop means on said shelf to arrest said rectilinear movement to position said shell in axial alignment with said spout, treadle means carried by said frame, said treadle means being operable to vertically move said shelf and tray from a first position in which a shell on said tray is in filling engagement with said spout to a second position in which said shell is lowered out of engagement with said spout, and counterweight means connected with said treadle means to urge said shelf and tray into said first position.

THOMAS F. KNIGHT.

REFERENCES CITED

The following references are of record in the file of this patent:

UNITED STATES PATENTS

| Number | Name | Date |
|---|---|---|
| 1,974,192 | Paxton | Sept. 18, 1934 |
| 207,853 | Dalzell | Sept. 10, 1878 |
| 2,355,848 | Clark | Aug. 15, 1944 |
| 1,465,300 | Fuzzard | Aug. 21, 1923 |
| 578,985 | Grove | Mar. 16, 1897 |
| 988,798 | Maxim | Apr. 4, 1911 |
| 1,372,009 | Davidson et al. | Mar. 22, 1921 |
| 1,453,933 | Gibbons et al. | May 1, 1923 |
| 1,477,040 | Davidson | Dec. 11, 1923 |
| 1,564,134 | Giannone | Dec. 1, 1925 |
| 1,633,656 | Young | June 28, 1927 |

FOREIGN PATENTS

| Number | Country | Date |
|---|---|---|
| 262 | Great Britain | May 4, 1911 |